(12) United States Patent
Bourgeois

(10) Patent No.: US 8,389,613 B2
(45) Date of Patent: Mar. 5, 2013

(54) AQUEOUS EMULSIONS COMPRISING POLYISOCYANATE/ACETAL SOLVENT COMPOSITIONS AND COATINGS/ADHESIVES PRODUCED THEREFROM

(75) Inventor: Damien Bourgeois, Clapiers (FR)

(73) Assignee: Vencorex France, Saint-Priest (FR)

( * ) Notice: Subject to any disclaimer, the term of this patent is extended or adjusted under 35 U.S.C. 154(b) by 566 days.

(21) Appl. No.: 12/295,008

(22) PCT Filed: Mar. 27, 2007

(86) PCT No.: PCT/EP2007/052922
§ 371 (c)(1),
(2), (4) Date: Jun. 17, 2010

(87) PCT Pub. No.: WO2007/110425
PCT Pub. Date: Oct. 4, 2007

(65) Prior Publication Data
US 2010/0279568 A1   Nov. 4, 2010

(30) Foreign Application Priority Data
Mar. 29, 2006   (FR) ...................... 06 02710

(51) Int. Cl.
*C08K 5/06* (2006.01)
*C08G 18/28* (2006.01)
*C08L 75/00* (2006.01)
*B32B 27/40* (2006.01)

(52) U.S. Cl. ........ 524/376; 524/377; 524/378; 524/590; 524/591; 428/423.1

(58) Field of Classification Search ............... 524/376, 524/377, 378, 590, 591; 428/423.1
See application file for complete search history.

(56) References Cited

U.S. PATENT DOCUMENTS

| 4,525,512 A * | 6/1985 | Hudson ................. 524/284 |
| 4,663,377 A * | 5/1987 | Hombach et al. ........... 524/196 |
| 5,830,938 A | 11/1998 | St. Laurent et al. |
| 6,482,914 B2 | 11/2002 | Bernard et al. |
| 2005/0239989 A1 | 10/2005 | Haberle et al. |
| 2006/0194918 A1* | 8/2006 | Pizzi et al. .................. 524/593 |

FOREIGN PATENT DOCUMENTS

| FR | 2866893 | * | 9/2005 |
| WO | WO 97/31960 A1 | | 9/1997 |
| WO | WO 2004/022623 A1 | | 3/2004 |
| WO | WO 2005/090492 A1 | | 9/2005 |

OTHER PUBLICATIONS

A product brochure for Bayhydur and Bayhydrol by Bayer, 2005.*

* cited by examiner

*Primary Examiner* — Tae H Yoon
(74) *Attorney, Agent, or Firm* — Buchanan Ingersoll & Rooney PC

(57) ABSTRACT

Water-emulsifiable polyisocyanate compositions admixed with at least one solvent of formula (1) $(R_1O)_2C(R_2)$—X—$R_3$ are formulated into aqueous emulsions which advantageously further comprise a compound, bearing a mobile hydrogen function, or a compound containing precursor functions capable of liberating hydroxyl functions, and are useful for producing coatings on a variety of substrates, e.g., made of cement, wood or leather in particular, and also for producing adhesives.

11 Claims, No Drawings

AQUEOUS EMULSIONS COMPRISING POLYISOCYANATE/ACETAL SOLVENT COMPOSITIONS AND COATINGS/ADHESIVES PRODUCED THEREFROM

CROSS-REFERENCE TO PRIORITY/PCT APPLICATIONS

This application claims priority under 35 U.S.C. §119 of FR 0602710, filed Mar. 29, 2006, and is a continuation/national phase of PCT/EP 2007/052922, filed Mar. 27, 2007 and designating the United States (published in the French language on Oct. 4, 2007, as WO 2007/110425 A1; the title and abstract were also published in English), each hereby expressly incorporated by reference in its entirety and each assigned to the assignee hereof.

The present invention relates to a mixture based on polyisocyanate and an acetal solvent, to an aqueous emulsion obtained from this mixture and to the use of this emulsion for producing coatings and adhesives.

It is known that diisocyanates, in particular alkylene diisocyanates and derivatives thereof of biuret type, or trimers thereof, are widely used in the paints and varnishes field.

Until recently, these products were generally used in solution in organic solvents. However, the use of organic solvents is becoming increasingly criticized because the solvents, or at least some of them, are reputed to be toxic or chronotoxic. Accordingly, attempts are increasingly being made to develop techniques which use only a small amount of solvent, or which are even solvent free. With this aim, compositions based on polyisocyanate which are both readily emulsifiable and can be readily used in emulsion in water have been developed. In this case, the water serves as a carrier for the components of the formulation and makes it possible to reduce the organic solvent content in said formulation. Furthermore, such compositions allow the material used for their application to be rinsed with water.

One of the problems associated with techniques of this type is that of obtaining emulsions which exhibit good stability, i.e. in fact emulsions in which the size of the globules in suspension in the liquid phase is as fine as possible. Moreover, it is of course required that the coatings obtained using these emulsions exhibit, at least overall, properties which are comparable to those of the coatings obtained from compositions in an organic solvent. This may be the case in particular as regards the appearance and more particularly the sheen.

The subject of the invention is therefore the development of a product capable of satisfying these problems.

With this aim, the invention relates to a polyisocyanate-based mixture, which is characterized in that it comprises:
a water-emulsifiable polyisocyanate composition;
at least one solvent of formula (1)

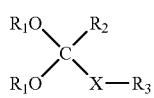

in which
$R_1$ represents a linear or branched $C_1$-$C_4$ alkyl group, the two radicals $R_1$ possibly being identical or different and also possibly being linked;
$R_2$ represents H or a linear or branched $C_1$-$C_4$ alkyl group;
X represents a linear or branched divalent alkyl radical containing from 1 to 6 carbon atoms, it being possible for X to also represent a covalent single bond;
$R_3$ represents H, $C(OR_1)_2R_2$, $C(O)OR_1$, $OC(O)R_2$ or $OC(O)OR_1$.

The invention also relates to an aqueous emulsion which is characterized in that it is obtained by water-emulsifying the mixture as described above, which mixture comprises a water-emulsifiable polyisocyanate composition and at least one solvent of formula (1) mentioned above, this emulsion also comprising at least one compound bearing at least one mobile-hydrogen function selected from primary or secondary hydroxyl functions, phenols, primary and/or secondary amines, carboxyl functions and a thiol function, or a compound containing precursor functions capable of freeing hydroxyl functions.

Other characteristics, details and advantages of the invention will emerge even more completely on reading the description which will follow, and also various concrete but nonlimiting examples intended to illustrate it.

As indicated above, the polyisocyanate-based mixture of the invention comprises two essential elements: a water-emulsifiable polyisocyanate composition and a specific solvent. These two elements will he described more specifically below.

The term "water-emulsifiable polyisocyanate composition" is intended to mean a composition based on one or more polyisocyanates and which, when it is placed in water, is capable of giving an emulsion, i.e. a liquid medium consisting of particles (globules or droplets) of liquid dispersed in another liquid phase.

Preferably, the composition is of the self-emulsifiable type, i.e. it is a composition capable of forming, in the presence of a liquid medium in which said composition is immiscible, an emulsion via a spontaneous mechanism. In the spontaneous emulsification mechanism, the energy required to form an emulsion involves only the energy required to redistribute the material to be emulsified in the mixture: thus, there is no need for any outside energy, essentially energy from stirring, in order to create the emulsion. In other words, simple manual stirring is sufficient to ensure a macroscopically uniform distribution of the discontinuous phase and to thus obtain the emulsion.

Water-emulsifiable polyisocyanate compositions are known products which have been described. A nonexhaustive description of products of this type is given below by way of illustration.

The preferred polyisocyanates are selected from the products of homocondensation or heterocondensation of alkylene diisocyanate, comprising in particular products of the "biuret" type and of the "trimer" type, or even "prepolymers" with an isocyanate function, comprising in particular urea, urethane, allophanate, ester, amide, acylurea, isocyanurate, oxadiazinetrione, immino-dimer, immino-trimer (imminotriazadione), immino-oxadiazinedione (also called asymmetrical trimer), or diazetidinedione (also called dimer) functions, and from the mixtures containing them.

The polyisocyanate compounds can also comprise true carbamate functions (R—O—C(=O)—NH$_2$) or epoxy functions or carbonate functions, which are preferably cyclic.

They may, for example be the polyisocyanates sold by the company Rhodia under the name "Tolonate®".

In general, the preferred polyisocyanates are the products of homocondensation or heterocondensation of the following aliphatic, (cyclo- or aryl-) aliphatic isocyanate monomers:
1,6-hexamethylene diisocyanate (HDI),
1,12-dodecane diisocyanate, 1,3-cyclobutane diisocyanate,
1,3- and/or 1,4-cyclohexane diisocyanate,
1-isocyanato-3,3,5-trimethyl-5-diisocyanatomethylcyclohexane (isophorone diisocyanate, IPDI),
isocyanatomethyloctylene diisocyanate (TTI), in particular 4-isocyanatomethyl-1,8-octylene diisocyanate,
2,4- and/or 2,6-hexahydrotoluylene diisocyanate ($H_6TDI$),
hexahydro-1,3 and/or 1,4-phenylene diisocyanate,
perhydro-2,4' and/or 4,4'-diphenylmethane diisocyanate ($H_{12}MDI$), and in general the aromatic amino precursors or the perhydrogenated carbamates,
bisisocyanatomethylcyclohexanes (in particular 1,3- and 1,4-) (BIC),
bisisocyanatomethylnorbornanes (NBDI),
2-methylpentamethylene diisocyanate (MPDI),
tetramethylxylylene diisocyanates (TMXDI), and
lysine diisocyanate and also the esters of lysine di- or triisocyanate (LDI or LTI).

The homocondensation products are the products derived from the condensation of one of the isocyanate monomers, mentioned in the above list, with itself. The heterocondensation products are the products derived from the condensation of two or more of the monomers mentioned in the above list, with one another and/or optionally with one or more mobile-hydrogen compounds, for instance an alcohol, a diol, a primary or secondary amine and other similar compounds.

The polyisocyanates included in the composition of the present invention may also be polyisocyanate derivatives derived from aromatic isocyanates used alone or as a mixture with aliphatic compounds.

By way of examples of aromatic isocyanates, mention may be made, in a nonlimiting manner, of the following:
2,4- and/or 2,6-toluylene diisocyanate,
2,4'- and/or 4,4'-diphenylmethane diisocyanate (MDI),
1,3- and/or 1,4-phenylene diisocyanate,
4,4',4''-triphenylmethane triisocyanate, and
oligomers of MDI, or TDI.

Mixtures of these (cyclo)aliphatic and/or aromatic polyisocyanates can also be used.

According to a specific embodiment of the invention, the composition comprises a polyisocyanate which is the product of the homocondensation of isocyanates selected from HDI and IPDI, or which originates from a mixture of these homocondensation products.

In order for the polyisocyanate composition to be emulsifiable within the meaning given above, it also comprises an additive for making it into an emulsion or for rendering it dispersible or water-soluble. This additive is of the surfactant type and it comprises at least one hydrophilic function in its structure. The term "hydrophilic additive" will be used in the subsequent description.

Several variants can therefore be envisioned.

In the case of a first variant, the polyisocyanate composition comprises a hydrophilic additive of the nonreactive type, i.e. this additive is present as a mixture with the composition without there having been a reaction between this additive and the polyisocyanate of the composition. As additive of this type, mention may be made of those described in documents WO 97/31960 and FR 2855768-A1, reference to the teaching of which may be made. These additives have an anionic function and advantageously a fragment of a polyethylene glycol chain with at least one, preferably at least 5, ethyleneoxy units.

Mention may more particularly be made, among these additives, of those of formula (2) below:

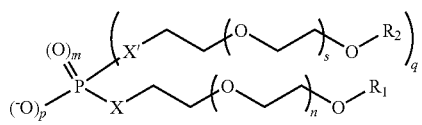

with, when q is equal to zero, those of formula (3):

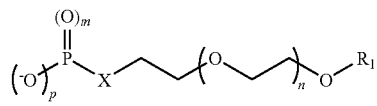

and where p represents zero or an integer between 1 and 2 (closed intervals, i.e. including the limits);
where m represents zero or an integer between 1 and 2 (closed intervals, i.e. including the limits);
where the sum p+m+q is at most equal to three;
where the sum 1+p+2m+q is equal to three or to five;
where X and X', which may be similar or different, represent an arm comprising at most two carbon-based chain members;
where n and s, which may be similar or different, represent an integer selected between 5 and 30, advantageously between 5 and 25, preferably between 9 and 20 (closed intervals, i.e. including the limits);
where $R_1$ and $R_2$ of formulae (2) and (3), which may be similar or different, represent a hydrocarbon-based radical advantageously selected from aryls and alkyls optionally substituted in particular with a halogen atom, in particular fluorine.

In the case of a second variant, the polyisocyanate composition contains a hydrophilic additive of the reactive type, i.e. this additive is present in the composition, but by being grafted onto the polyisocyanate of the composition. As additives that can be grafted onto the polyisocyanates, mention may be made of the hydrophilic additives mentioned in U.S. Pat. No. 4,663,377, to the teaching of which reference may be made.

As other graftable additives, mention may also be made of those of the nonionic or ionic (cationic or anionic) type such as those mentioned in EP-A-0703255, these additives comprising —$SO_3H$ or —$SO_3^-$ groups.

Finally, a third variant, which is the combination of the previous two variants can be envisioned, i.e. the composition contains both a nonreactive additive and a grafted additive.

The mass ratio of the polyisocyanate composition to the hydrophilic additive is most commonly at most equal to approximately 33%, advantageously at most equal to approximately 20%, preferably to approximately 10%. This mass ratio is advantageously greater than 1%, preferably than 2%.

The other essential element of the polyisocyanate-based mixture of the invention is the solvent. The latter is of the acetal type and corresponds to formula (1) given above.

Embodiments that are more specific with regard to the nature of the solvent will be described hereinafter, always with reference to formula (1) given above.

It will be noted first of all that the radicals $R_1$ can optionally be linked so as to form dioxolane or dioxane bridges.

X may be an alkyl radical containing from 1 to 6 carbon atoms, preferably from 1 to 4 carbon atoms. The alkyl radical may optionally be substituted so as to comprise ketone, ester or ether groups, for example.

The solvent may contain at most 20 carbon atoms and it may have a melting point of at most 0° C. and a boiling point of at most 350° C.

The solvent may correspond more particularly to formula (1) in which $R_2$ represents H or $CH_3$, X is a covalent bond and $R_3$ represents $CH_3$, —$(CH)(OR_1)_2$ or —$C(=O)(OR_1)$.

According to a particular embodiment, the solvent may be selected more particularly from those of formula (1) in which the groups $R_1$ may be methyl or ethyl radicals, X is a covalent bond and $R_2$ is hydrogen. In the case of this embodiment, the solvent may correspond more particularly to formula (1) in which $R_2$ represents H, $R_3$ represents —$(CH)(OR_1)_2$ and $R_1$ represents the ethyl radical, the solvent then being 1,1,2,2-tetraethoxyethane. In the case of this embodiment, the solvent may also correspond more particularly to formula (1) in which $R_2$ represents H, $R_3$ represents —$C(=O)(OR_1)$ and $R_1$ represents the ethyl radical, the solvent then being ethyl 2,2-diethoxyacetate. The solvent may also correspond to formula (1) in which $R_2$ represents H, $R_3$ represents —$C(=O)(OR_1)$ and $R_1$ represents the methyl radical, the solvent then being methyl 2,2-dimethoxyacetate.

According to a preferred embodiment, the solvent corresponds to formula (1) in which $R_2$ represents H, $R_3$ represents —$(CH)(OR_1)_2$ and $R_1$ represents the methyl radical, the solvent then being 1,1,2,2-tetramethoxyethane.

The latter solvent constitutes an advantageous variant since 1,1,2,2-tetramethoxyethane is a product which has little odor, which is non-inflammable and which is non-toxic. It is also water-miscible in any proportions.

The solvents used in the context of the invention and which have just been described are known products. Reference may be made to the teaching of FR-A-2855171 in particular.

Of course, the invention covers cases where the mixture contains several solvents. These solvents may be a mixture of solvents according to formula (1) above. This may also be a combination of a solvent or of a mixture of solvents according to formula (1) with one or more other known solvents used for mixtures of this type, for example butyl acetate, methoxypropyl acetate, propylene glycol diacetate, butyl ethylene glycol acetate, dimethyl dipropylene glycol, carbonic acid esters, such as propylene carbonate, lactones such as—caprolactone, ethyl ethoxypropionate or N-ethylpyrrolidone. These solvents are, however, preferably selected from those which are non-flammable and non-toxic.

A solvent with a boiling point of between 50° C. and 350° C., more particularly between 100° C. and 300° C., is preferably used.

The solvents used in the mixtures of the invention make it possible to confer on said mixtures a viscosity that is suitable according to the type of use desired.

The respective proportion of polyisocyanate composition and of solvent in the mixture of the invention is generally between 5% and 60%, more particularly between 5% and 50%, and even more particularly between 5% and 30% by mass of solvent relative to the entire mixture.

It will be noted that, in the case of a mixture of one or more solvents according to the invention with one or more known solvents mentioned above, the proportion of solvent according to the invention is preferably at least 50% by mass relative to all these solvents, the overall proportion of all the solvents then remaining within the range given in the previous paragraph.

The invention also relates, as new product, to a mixture which can be considered to be a precursor product for the mixture which has just been described above. In the subsequent description, this product will be referred to using the term "precursor mixture" in order to distinguish it from the first mixture described above, but it should be understood that this precursor mixture should be considered as such and that it can be used for a purpose other than that of preparing the first mixture of the invention, without departing from the context of the present invention.

This precursor mixture is characterized in that it comprises a polyisocyanate composition and at least one solvent of formula (1) mentioned above. Everything that has been described above regarding the solvent and regarding the polyisocyanates of the composition applies here with regard to the precursor mixture. The difference with the mixture described above is that, in the precursor mixture, the polyisocyanate composition does not comprise any hydrophilic additive.

To go from the precursor mixture of the invention to the mixture per se, the hydrophilic additive is added to the former. This addition may be carried out by simply mixing the additive with the polyisocyanate composition in solution in the solvent. In the case of a hydrophilic additive of reactive type, the mixing can be carried out more particularly at a temperature of between, for example, 50° C. and 130° C., according to the type of additive.

Another possibility for obtaining the first mixture according to the invention from the precursor mixture is to add an emulsifiable polyisocyanate to the precursor mixture. In this case, it is not necessary to add a hydrophilic additive to the precursor mixture.

The mixture of the invention can be mixed with aqueous dispersions of polyurethane. Aqueous dispersions that are suitable in the context of the invention are known per se and are described, for example, in documents U.S. Pat. No. 3,479, 310, GB1076688, U.S. Pat. Nos. 4,108,814, 4,092,286, DE2651505, U.S. Pat. No. 4,190,566, DE2732131 or DE 2811148, or in documents US2006240264, US2005288431, US2005209425, U.S. Pat. No. 7,012,115 or EP986592.

As was seen above, the invention also relates to an aqueous emulsion obtained from the water-emulsifiable polyisocyanate composition/solvent mixture described above.

The aqueous phase of the emulsion serves as a vector for the coreactant(s) that can be polycondensed with the polyisocyanate(s) of the polyisocyanate composition, i.e. the mobile-hydrogen compound(s) mentioned above.

The mobile-hydrogen compounds that can be used are well known. Preferably, these compounds are selected from polyols which can be used alone or as a mixture, or else compounds containing precursor functions capable of freeing hydroxyl functions. This may advantageously be acrylic, polyester or polyurethane polymers or hybrids of these polymers. Mention may also be made of polyethers.

As precursor functions capable of freeing hydroxyl functions, mention may, for example, be made of epoxy, carbonate or dioxolane functions. These precursor functions free the hydroxyl functions by reaction with a suitable nucleophile such as an amine or water, optionally in the presence of a catalyst, which may be an acid compound or a Lewis acid in an amount by weight which may be between, for example, 50 and 5000 ppm, more particularly between 100 and 500 ppm, this amount being expressed by weight of catalyst relative to the dry extract of the polyisocyanate composition and of the compound bearing at least one mobile-hydrogen function.

The emulsion may also contain organic or inorganic additives, such as a pigment, a rheology additive, a thickener, surface agents, or catalysts, depending on the desired properties.

The emulsion thus obtained exhibits, for the polyisocyanate part, particles (globules) of which the d50 is at most 200 nm, more particularly at most 160 nm, and even more particularly at most 130 nm.

The invention also relates to a process for producing a coating on a substrate, in which the emulsion described above is used. The term "coating" is intended to mean any type of layer applied to a substrate so as to protect and/or decorate the latter, for example a paint or a varnish.

The process is carried out by applying the emulsion to the substrate by any known technique. The substrate is a material which can be selected from wood, metals, cements, plastics, textiles and leather.

In the case of a metal substrate, the metal may, for example, be aluminum or a steel.

It will be noted that the process is applied to substrates that may comprise several coatings superimposed and, in this case, the product of the invention can be used for the preparation of any one of these coatings. However, the product of the invention may be advantageously used for a topcoating, this is in particular the case of leather substrates.

Once the emulsion has been deposited, the reaction between the polyisocyanate composition and the compound bearing at least one mobile-hydrogen function can take place at ambient temperature or under hot conditions at a temperature which may be between 30° C. and 300° C., preferably between 40° C. and 250° C., and even more preferably between 50° C. and 150° C. The temperature and the time for crosslinking are adjusted according to the substrate. In the case of temperature-sensitive substrates, crosslinking catalysts will more particularly be used.

The emulsion of the invention may also be used as an adhesive. In such a case, a coating is formed as described above, this coating in this case having adhesive properties, on a substrate intended to be bonded with another element. The substrate may most particularly be a substrate made of wood.

Examples will now be given.

In these examples, the abbreviations used have the meanings indicated below.

| | |
|---|---|
| TME: | 1,1,2,2-tetramethoxyethane |
| HDI: | 1,6-hexamethylene diisocyanate |
| IPDI: | isophorone diisocyanate |
| $D_{50}$: | median particle size |

The following starting materials were used:

Tolonate® HDT: HDI-based polyisocyanate compound containing 100% dry extract (D.E.), sold by the company Rhodia, having approximately 22% of NCO functions per 100 g of material, and a viscosity of approximately 2400 mPa·s at 25° C.

Rhodocoat® XEZ-M 502: HDI-based hydrophilic polyisocyanate compound containing 100% dry extract (D.E.), sold by the company Rhodia, having approximately 18.4% of NCO functions per 100 g of material, and a viscosity of approximately 3600 mPa·s at 25° C.

Hydrophilic additives or emulsifiers: they are phosphate esters of polyethylene oxides comprising ($C_{13}$) alkyl fatty chains. They differ in terms of the monoester/diester ratio. The characteristics of the emulsifiers are given in table 1 below. These emulsifiers are, moreover, described in example 1 of FR-A-2870253.

TABLE 1

| Reference | Number of alkylene oxide units | Proportion of diester |
|---|---|---|
| TA.X | 9 | 30% |
| TA.Y | 9 | 10% |

The examples also make reference to tests described below.

Gloss: this measurement is characteristic of the homogeneity and of the appearance of the films. It is performed after drying for 7 days using an Erichsen model S40 glossmeter according to the angle specified.

Persoz hardness: the Persoz hardness measurements are performed in an air-conditioned room at 23±3° C. and a relative humidity of 50±10%. The device used is a type 300 test pendulum from Erichsen with a launching stop and automatic counting. The principle of the hardness pendulum is based on the oscillations of a pendulum placed on the film. The number of oscillations increases as the varnish increases in hardness and dryness. The measurement of gain in hardness is the number of oscillations which the pendulum takes to be damped and then to come to a stop. The duration of an oscillation is one second. The test is finished when the damping of the oscillations reaches an amplitude of 4°.

EXAMPLE 1

This example illustrates the ability of a mixture according to the invention to give an emulsion in water, the particle sizes of which are fine.

45 ml of water and then 5 g of an emulsifiable polyisocyanate formulation are introduced into a 100 ml beaker equipped with a mechanical stirring system. Stirring is carried out for 5 min at 400 rpm. The emulsion thus obtained is analyzed with a Malvern Mastersizer 2000 laser diffraction particle sizer.

The following mixtures are thus formed.

Mixture A according to the invention: 70 g of Rhodocoat XEZ-M 502 are mixed with 30 g of TME.

Mixture B according to the invention: 50 g of Rhodocoat XEZ-M 502 are mixed with 50 g of TME.

Mixture C (comparative): 70 g of Rhodocoat XEZ-M 502 are mixed with 30 g of Shellsol A.

Mixture D (comparative): 70 g of Rhodocoat XEZ-M 502 are mixed with 30 g of Rhodiasolv DIB (diisobutyl ester).

Mixture E (comparative): 70 g of Rhodocoat XEZ-M 502 are mixed with 30 g of N-methylpyrrolidinone (NMP).

Tables 2 and 3 below give the characteristics of the emulsions obtained from these mixtures.

TABLE 2

| Mixture | Proportion of TME | Viscosity (mPa · s) | $D_{50}$ (nm) |
|---|---|---|---|
| Rhodocoat XEZ-M 502 alone | 0% | 3600 | 92 |
| A | 30% | 120 | 128 |
| B | 50% | 30 | 159 |

TABLE 3

| | Proportion of solvent | $D_{50}$ (nm) |
|---|---|---|
| C | 30% | 2800 |
| D | 30% | 7300 |
| E | 30% | 158 |

The use of TME makes it possible to greatly reduce the viscosity of the self-emulsifiable polyisocyanate formulation while at the same time keeping a very small median particle size. At an identical proportion of solvent, the emulsion according to the invention has a smaller particle size than in the case of the prior art emulsions.

EXAMPLE 2

This example illustrates the use of an emulsion according to the invention in a lacquer formulation for concrete floors.

Preparation of the Paint

A two-component polyurethane-type paint for concrete floors is prepared in the following way:

Part A:

A first series of the following products is successively mixed:

| Product | Amount |
|---|---|
| Halwedrol FV 7425/40w (polyol) (DSM) | 31.75 g |
| Coadis 123K (wetting agent) (Coatex) | 0.70 g |
| Byk 011 (antifoam) (Byk chimie) | 1.50 g |
| Byk 341 (surface agent) (Byk chimie) | 0.40 g |
| Kronos 2310 (pigment) (Kronos) | 23 g |

A second series of the following products is moreover dispersed in a ball mill:

| Product | Amount |
|---|---|
| Halwedrol FV 7425/40w | 38.4 g |
| Byk 011 | 0.50 g |
| Byk 346 (Byk chimie) | 0.60 g |
| Byk 341 | 0.30 g |
| Coapur 3025 (thickener) (Coatex) | 0.25 g |

The first and second series of products (100 g in total) are mixed with vigorous stirring so as to give part A.

Part B:

80 g of Rhodocoat XEZ-M 502 and 20 g of TME are mixed.

Production of the Coating 6.7 g of part B are introduced into 30 g of part A. The preparation thus obtained is mixed with a spatula until complete homogenization (2 min). It is then applied to a flat glass support, with a thickness of 200 μm wet, and the whole is left to dry for 7 days in a controlled atmosphere at 23° C. and 50% relative humidity. A coating is then obtained which has the following characteristics:

Gloss at 60°: 77
Hardness (Persoz): 93
Thickness: 52 μm

EXAMPLE 3

This example illustrates the use of an emulsion according to the invention in a matt lacquer formulation for concrete floors.

Preparation of the Paint

A two-component polyurethane-type paint for concrete floors is prepared in the following way:

Part A:

A first series of the following products is successively mixed:

| Products | Amount |
|---|---|
| Halwedrol FV 7541/45w (polyol) (DSM) | 30.0 g |
| Texanol (coalescence agent) (Eastman) | 0.2 g |
| Surfynol 104$^E$ (surface agent) (Air products) | 1.0 g |
| Tego Airex 902w (Tego chimie) | 0.8 g |
| Coatex BR3 (Coatex) | 0.5 g |
| Kronos 2310 (Kronos) | 20.0 g |
| Blanc Fixe Micro (Sachtleben) | 3.0 g |

A second series of the following products is moreover dispersed in a ball mill:

| Products | Amount |
|---|---|
| Halwedrol FV 7541/45w DSM | 38.4 g |
| Surfynol 104$^E$ Air products | 0.8 g |
| Byk 346 Byk chimie | 0.5 g |
| Byk 341 Byk chimie | 0.5 g |
| water | 4.0 g |
| Coapur 3025 Coatex | 0.3 g |

The first and second series of products (100 g in total) are mixed with vigorous stirring so as to give part A.

Part B:

80 g of Rhodocoat XEZ-M 502 and 20 g of TME are mixed.

Production of the Coating 15.9 g of part B are introduced into 100 g of part A. The preparation thus obtained is mixed with a spatula until complete homogenization (2 min); it remains relatively fluid. It is subsequently applied to a flat glass support, with a thickness of 200 μm wet, and the whole is left to dry for 7 days in a controlled atmosphere at 23° C. and 50% relative humidity. A coating is then obtained which has the following characteristics:

Gloss at 60°: 14
Hardness (Persoz): 154

EXAMPLE 4 (COMPARATIVE)

A two-component polyurethane-type paint for concrete floors is prepared with part A described in example 3 and the following part B:

Part B:

80 g of Rhodocoat XEZ-M 502 and 20 g of Rhodiasolv RPDE (methyl diester of a mixture of carboxylic acids) are mixed.

Production of the Coating:

15.9 g of part B are introduced into 100 g of part A. The preparation thus obtained is mixed with a spatula until complete homogenization (2 min). The preparation becomes pasty. It is subsequently applied to a flat glass support, with a thickness of 200 μm wet, and the whole is left to dry for 7 days in a controlled atmosphere at 23° C. and 50% relative humidity. A coating having the following characteristics is obtained:

TABLE 4

| Gloss at 60° | Hardness (Persoz) |
|---|---|
| 11 | 120 |

The use of TME makes it possible to obtain both a preparation which is more fluid after mixing parts A and B, which is important for applying it with ease, and coatings with a substantially greater hardness, which is a key point for the mechanical strength of paints for floors.

EXAMPLE 5

This example concerns the preparation of a precursor mixture according to the invention.

A trimer of IPDI is prepared according to patent application FR-A-2808528. After separation by distillation of the unreacted IPDI, a viscous liquid, which solidifies during cooling to 25° C., is obtained. The solid thus obtained is finely ground.

1.3 kg of TME are introduced into a 6 l reactor. Heating is carried out at 100° C. with mechanical stirring, and 3.1 kg of the solid obtained above are added in small portions. Mixing is then carried out for 2 h, until complete dissolution of the solid. A colorless, clear and viscous liquid having the following characteristics is obtained:

Dry extract: 70%
Viscosity: 13500 mPa·s
NCO titer: 11.5%

EXAMPLE 6

This example concerns the preparation of a mixture according to the invention comprising an emulsifiable polyisocyanate formulation.

11.2 g of the IPDI trimer formulation prepared in example 5, 15.8 g of Tolonate HDT, 3 g of a mixture of the TA.X and TA.Y emulsifiers mentioned above, neutralized with dimethylcyclohexylamine (DMCHA), and 2 g of TME are introduced successively into a 60 ml glass flask. The flask is mixed on a horizontal mixer of pot roller type for 24 h. A homogeneous and colorless liquid is obtained.

EXAMPLE 7

This example describes the use of a mixture of the invention for a gloss lacquer formulation for floors.

Part A described in example 2 and the hardener mixture described in example 6 are used.

6.5 g of hardener are added per 30 g of part A. The mixture is homogenized using a spatula for 5 min. It is subsequently applied to a flat glass support, with a thickness of 200 μm wet, and the whole is left to dry for 7 days in a controlled atmosphere at 23° C. and 50% relative humidity.

The following results are obtained:

| | |
|---|---|
| Part A alone: | gloss at 20°: 61 |
| Complete paint: | gloss at 20°: 77 |
| | hardness: 203 |

EXAMPLES 8 TO 20

These examples describe the use of a mixture of the invention in a formulation for treating leather.

EXAMPLES 8 TO 17

The leather used is a supple, black, full grain calfskin leather intended mainly for the automobile and furniture sector.

The tests are carried out on leather samples prepared in the following way:

Application of a black pigmented base according to the following formula (base coat no. 1):

| | | |
|---|---|---|
| Bayderm 51 UD (Lanxess) | 160 g | Polyurethane dispersion |
| Bayderm DLV (Lanxess) | 120 g | Polyurethane dispersion |
| Primal SB 150 (Rohm & Haas) | 130 g | Acrylic binder |
| Pigment Lepton Noir (BASF) | 100 g | Pigment |
| Euderm mat SN 01 (Lanxess) | 50 g | Matting agent |
| Water | 440 g | |
| Total | 1000 g | |

Drying
Press satinizing (smooth plate)
Filling-in by second application of the above formula
Drying
Application of the aqueous fixing mix containing the mixture of the invention, by spraying
Drying/infrared tunnel 80° C.
Satinizing/final graining The aqueous fixing mixes prepared from commercial products are the following:

Fixing Mix M1

| | | |
|---|---|---|
| Aqualen 2004 (Clariant) | 250 g | Polyurethane dispersion |
| Aqualen 2007 (Clariant) | 250 g | Polyurethane dispersion |
| Aqualen D2015 (Clariant) | 150 g | Polyurethane dispersion |
| Water | 350 g | |
| Total | 1000 g | |

Ford viscosity cup no. 4=19 s
Dry extract=15%

Fixing Mix M2

| | | |
|---|---|---|
| Bayderm finish 85 UD (Lanxess) | 350 g | Polyurethane dispersion |
| Aquaderm matt STN (Lanxess) | 350 g | Polyurethane dispersion |
| Acrysol RM 1020 (Lanxess) | 25 g | Thickener |
| Water | 275 g | |
| Total | 1000 g | |

Ford viscosity cup no. 4=18 s
Dry extract=17%

Fixing Mix M3

| | | |
|---|---|---|
| Astacin Novomatt GG (BASF) | 300 g | Polyurethane dispersion |
| Astacin mat HS (BASF) | 300 g | Polyurethane dispersion |
| Acrysol RM 1020 (Lanxess) | 15 g | Thickener |
| Water | 385 g | |
| Total | 1000 g | |

Ford viscosity cup no. 4=19 s
Dry extract=17%

The crosslinker used is a mixture of Rhodocoat® X EZ-M 502 with TME having a dry extract of 80%. The amount of crosslinker is selected such that the proportion of Rhodocoat® X EZ-M 502 with respect to the dry extract of the fixing mix is 10, 20, 30 or 40%.

| Example | Proportion of crosslinker relative to the dry extract of the fixing mix (%) | Nature of the fixing mix | Amount of crosslinker (g) |
| --- | --- | --- | --- |
| 8 | 40 | M1 | 75 |
| 9 | 30 | M1 | 56.25 |
| 10 | 40 | M2 | 85 |
| 11 | 30 | M2 | 63.75 |
| 12 | 20 | M2 | 42.5 |
| 13 | 10 | M2 | 21.25 |
| 14 | 40 | M3 | 85 |
| 15 | 30 | M3 | 63.75 |
| 16 | 20 | M3 | 42.5 |
| 17 | 10 | M3 | 21.25 |

Wet Rub Resistance

The test is carried out using a Veslic machine, which consists in performing translational rubbing movements using a moist felt pad under a load of 1000 g for 200 cycles. At the end of the test, a grade is assigned according to the final condition of the rubbed surface and to the appearance of the felt pad. This grade ranges from 1 (very poor resistance) to 5 (very good resistance).

| Example | Wet rub resistance |
| --- | --- |
| 8 | 3 |
| 9 | 3 |
| 10 | 5 |
| 11 | 4 |
| 12 | 3-4 |
| 13 | 3 |
| 14 | 5 |
| 15 | 5 |
| 16 | 4-5 |
| 17 | 4 |

Flex Resistance

The test consists in subjecting a leather test piece to a series of flexes on a Bally flexometer device. After 20 000 cycles, no difference is noted between the various compositions, which do not exhibit any degradation (crazing).

EXAMPLE 18

Feel agents are added to the fixing mix according to the following composition:

Fixing Mix M4

| | | |
| --- | --- | --- |
| Astacin Novomatt GG (BASF) | 300 g | Polyurethane dispersion |
| Astacin mat HS (BASF) | 300 g | Polyurethane dispersion |
| Acrysol RM 1020 (Lanxess) | 15 g | Thickener |
| HMW 2220 (Dow Corning) | 30 g | Feel agent (60% DE) |
| Water | 355 g | |
| Total | 1000 g | |

The leather used is treated in the same way as above (base coat no. 1).

The amount of crosslinker used is the following: 63.75 g.

Pot Life

The test consists in evaluating the period of time for which the fixing mixes prepared can be used without degradation of the properties.

The application is carried out at various times relative to the preparation of the fixing mix.

$T_0$: immediately after preparation of the mixture
$T_2$: 2 h after the preparation of the mixture
$T_4$: 4 h after the preparation of the mixture
$T_8$: 8 h after the preparation of the mixture The viscosity of the mixture is also determined using Ford cup 4.

The wet rub resistance test is carried out according to the method described above, 6 days after the application and with a cycle number of 250 instead of 200.

| Time | Rub resistance | Viscosity (in s) |
| --- | --- | --- |
| $T_0$ | 5 | 20 |
| $T_2$ | 5 | 20 |
| $T_4$ | 5 | 20 |
| $T_8$ | 5 | 20 |

The results show that the performance levels remain unchanged up to 8 hours after the mixing of the compounds of the fixing mix.

EXAMPLES 19 TO 22

In order to obtain optimal properties, an amount of crosslinker is introduced into the following base no. 2 (20% of active material relative to the dry extract of the base).

Base No. 2

| | | |
| --- | --- | --- |
| Bayderm 51 UD (Lanxess) | 150 g | Polyurethane dispersion |
| Bayderm DLV (Lanxess) | 100 g | Polyurethane dispersion |
| Primal SB 150 (Rohm & Haas) | 150 g | Acrylic binder |
| Pigment Lepton Noir (BASF) | 100 g | Pigment |
| Euderm mat SN 01 (Lanxess) | 100 g | Matting agent |
| Water | 400 g | |
| Total | 1000 g | |

The crosslinker used in the base is the same as that incorporated into each fixing mix. The comparison is carried out with a reference system according to the following formula:

| Fixing mix M5 (semi-matt) | | |
| --- | --- | --- |
| Astacin Novomatt GG (BASF) | 300 g | Polyurethane dispersion |
| Astacin mat HS (BASF) | 300 g | Polyurethane dispersion |
| Acrysol RM 1020 (Lanxess) | 15 g | Thickener |
| HMW 2220 (Dow Corning) | 60 g | Feel agent (60% DE) |
| Water | 325 g | |
| Total | 1000 g | |

Fixing Mix M6 (Matt)

| Examples | | | |
|---|---|---|---|
| Astacin Novomatt GG (BASF) | 350 g | Polyurethane dispersion |
| Astacin mat HS (BASF) | 250 g | Polyurethane dispersion |
| Acrysol RM 1020 (Lanxess) | 10 g | Thickener |
| HMW 2220 (Dow Corning) | 60 g | Feel agent (60% DE) |
| Water | 330 g | |
| Total | 1000 g | |

The commercial crosslinker used is the reference product Astacin CN sold by the company BASF; it is an aliphatic polyisocyanate diluted in propylene carbonate at 70%.

The amounts of crosslinker used are the following:

| Examples | Nature of crosslinker | Nature of fixing mix | Amount of crosslinker (g) |
|---|---|---|---|
| 19 (comparative) | Astacin CN | M5 | 72.85 |
| 20 | Rhodocoat X-EZ-M 502 at 80% in TME | M5 | 63.75 |
| 21 (comparative) | Astacin CN | M6 | 72.85 |
| 22 | Rhodocoat X-EZ-M 502 at 80% in TME | M6 | 63.75 |

Wet Rub Resistance

The wet rub resistance tests are carried out as described above using various aggressive agents:

| | Wet rub resistance | | | |
|---|---|---|---|---|
| Examples | 250 cycles water | 500 cycles water | 100 cycles essence C | 100 cycles 50/50 alcohol/water |
| 19 | 5 | 5 | 5 | 5 |
| 20 | 5 | 5 | 5 | 5 |
| 21 | 5 | 5 | 5 | 5 |
| 22 | 5 | 5 | 5 | 5 |

The wet rub resistance is excellent in all the situations.

Gloss Measurement

The gloss is measured using a Mercury datacolor glossmeter under an angle of 85°.

0 corresponds to a very matt object, 100 to a very glossy object.

| Examples | Gloss |
|---|---|
| 19 | 7 |
| 20 | 6 |
| 21 | 5 |
| 22 | 5 |

Ideally, the treated surface of the leather should be as matt as possible. In the semi-matt formulation no. 5, the crosslinker which is the subject of the invention makes it possible to obtain a lower gloss value.

Flex Resistance

The test consists in subjecting a leather test piece to a series of flexes on a Bally flexometer device. After 100 000 cycles, no difference is noted between the various compositions, which do not exhibit any degradation (crazing).

The invention claimed is:

1. A polyisocyanate/acetal solvent mixed composition which comprises:
a water-emulsifiable polyisocyanate composition comprising, in admixture, at least one polyisocyanate and at least one hydrophilic additive; and
at least one solvent having the formula (1):

in which:
the radicals $R_1$, which may be identical or different and optionally linked together, are each a linear or branched $C_1$-$C_4$ alkyl radical;
$R_2$ is H or a linear or branched $C_1$-$C_4$ alkyl radical;
X is a linear or branched divalent alkyl radical having from 1 to 6 carbon atoms, or a covalent single bond; and
$R_3$ is H, $C(OR_1)_2R_2$, $C(O)OR_1$, $OC(O)R_2$ or $OC(O)OR_1$.

2. The polyisocyanate/acetal solvent mixed composition as defined by claim 1, said solvent containing up to 20 carbon atoms and having a melting point of at most 0° C. and a boiling point of at most 350° C.

3. The polyisocyanate/acetal solvent mixed composition as defined by claim 1, said solvent corresponding to formula (1) in which $R_2$ is H or $CH_3$, X is a covalent bond and $R_3$ is $CH_3$, —$(CH)(OR_1)_2$ or —$C(=O)(OR_1)$.

4. The polyisocyanate/acetal solvent mixed composition as defined by claim 1, said at least one hydrophilic additive having an anionic function and a fragment of a polyethylene glycol chain with at least one ethyleneoxy structural unit.

5. A precursor mixture which comprises:
a polyisocyanate composition;
at least one solvent of formula (1)

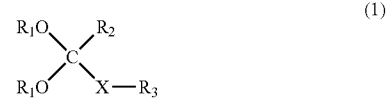

in which:
the radicals $R_1$, which may be identical or different and optionally linked together, are each a linear or branched $C_1$-$C_4$ alkyl radical;
$R_2$ is H or a linear or branched $C_1$-$C_4$ alkyl radical; X is a linear or branched divalent alkyl radical having from 1 to 6 carbon atoms, or a covalent single bond; and
$R_3$ is H, $C(OR_1)_2R_2$, $C(O)OR_1$, $OC(O)R_2$ or $OC(O)OR_1$.

6. The polyisocyanate/acetal solvent mixed composition as defined by claim 1, comprising a solvent of formula (1) in which the groups $R_1$ are methyl or ethyl radicals, X is a covalent bond and $R_2$ is hydrogen.

7. The polyisocyanate/acetal solvent mixed composition as defined by claim 6, comprising at least one solvent selected from among 1,1,2,2-tetraethoxyethane, 1,1,2,2-tetramethoxyethane, methyl 2,2-dimethoxyacetate and ethyl 2,2-diethoxyacetate.

8. The polyisocyanate/acetal solvent mixed composition as defined by claim 1, said polyisocyanate comprising at least one product of homocondensation or heterocondensation of an alkylene diisocyanate, or a biuret or trimer product, or a urea, urethane, allophanate, ester, amide, acylurea, isocyanurate, oxadiazinetrione, immino-dimer, immino-trimer (imminotriazadione), immino-oxadiazinedione (asymmetrical trimer) or diazetidinedione (dimer) function, or mixture thereof.

9. The polyisocyanate/acetal solvent mixed composition as defined by claim 8, said polyisocyanate comprising at least one homocondensation or heterocondensation product of the following aliphatic, (cyclo- or aryl-) aliphatic isocyanate monomers:
- 1,6-hexamethylene diisocyanate (HDI),
- 1,12-dodecane diisocyanate,
- 1,3-cyclobutane diisocyanate,
- 1,3- and/or 1,4-cyclohexane diisocyanate,
- 1-isocyanato-3,3,5-trimethyl-5-diisocyanatomethylcyclohexane (isophorone diisocyanate, IPDI),
- isocyanatomethyloctylene diisocyanate (TTI),
- 2,4- and/or 2,6-hexahydrotoluylene diisocyanate ($H_6$TDI),
- hexahydro-1,3 and/or 1,4-phenylene diisocyanate,
- perhydro-2,4' and/or 4,4'-diphenylmethane diisocyanate ($H_{12}$MDI), and/or an aromatic amino precursor or perhydrogenated carbamate,
- a bisisocyanatomethylcyclohexane (BIC),
- a bisisocyanatomethylnorbornane (NBDI),
- 2-methylpentamethylene diisocyanate (MPDI),
- a tetramethylxylylene diisocyanate (TMXDI),
- lysine diisocyanate and also an ester of lysine di- or triisocyanate (LDI or LTI),
- 2,4- and/or 2,6-toluylene diisocyanate,
- 2,4'- and/or 4,4'-diphenylmethane diisocyanate (MDI),
- 1,3- and/or 1,4-phenylene diisocyanate,
- 4,4',4"-triphenylmethane triisocyanate, and
- an oligomer of MDI, or TDI.

10. The polyisocyanate/acetal solvent mixed composition as defined by claim 9, said polyisocyanate comprising at least one product of the homocondensation of isocyanates selected from HDI and IPDI, or from mixture thereof.

11. An aqueous emulsion obtained from the mixed composition as defined by claim 1, the aqueous emulsion further comprising at least one compound bearing at least one mobile-hydrogen function selected from the group consisting of primary or secondary hydroxyl functions, phenols, primary and/or secondary amines, carboxyl functions and a thiol function, or a compound containing precursor functions that release free hydroxyl functions.

* * * * *